(12) United States Patent
Anzai (10) Patent No.: US 7,717,412 B2
(45) Date of Patent: May 18, 2010

(54) SPRING-PRESSURIZING UNIT AND FITTING-WASHER

(75) Inventor: Hisao Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 11/889,107

(22) Filed: Aug. 9, 2007

(65) Prior Publication Data

US 2008/0038082 A1 Feb. 14, 2008

Related U.S. Application Data

(63) Continuation of application No. PCT/JP2005/002278, filed on Feb. 15, 2005.

(51) Int. Cl.
*F16B 19/00* (2006.01)

(52) U.S. Cl. .................. 267/174; 267/179; 411/26; 411/265

(58) Field of Classification Search ......... 267/174–179; 411/24–27, 155, 156, 535–544, 265, 270; 172/705, 708
See application file for complete search history.

(56) References Cited

U.S. PATENT DOCUMENTS

| 1,120,368 | A | * | 12/1914 | Rohmer et al. ............. 411/26 |
| 2,449,846 | A | * | 9/1948 | Gilman ..................... 411/237 |
| 3,227,031 | A | * | 1/1966 | Williams ................... 411/26 |
| 3,236,277 | A | * | 2/1966 | Jones, Jr. et al. ............ 411/155 |
| 3,303,736 | A | * | 2/1967 | Raynovich, Jr. ............ 411/26 |
| 4,321,971 | A | * | 3/1982 | Hake et al. ................ 172/710 |
| 4,457,501 | A | * | 7/1984 | Davis ...................... 267/177 |
| 4,461,358 | A | * | 7/1984 | Lewison .................... 172/705 |
| 4,502,548 | A | * | 3/1985 | Griffin ..................... 172/705 |
| 4,978,264 | A | * | 12/1990 | Philippe .................... 411/26 |
| 5,056,975 | A | * | 10/1991 | Ando ....................... 411/155 |
| 5,496,142 | A | * | 3/1996 | Fodor et al. ................ 411/544 |
| 6,032,630 | A | | 3/2000 | Yamamoto et al. |
| 6,244,806 | B1 | * | 6/2001 | Kato ........................ 411/265 |
| 6,564,728 | B2 | * | 5/2003 | Ryan et al. ................. 111/123 |
| 2006/0110238 | A1 | * | 5/2006 | Tsukui ...................... 411/536 |

FOREIGN PATENT DOCUMENTS

| JP | 55-35213 | 3/1980 |
| JP | 55-61630 | 4/1980 |
| JP | 3-15708 | 2/1991 |
| JP | 4-186752 | 7/1992 |
| JP | 11-148321 | 6/1999 |
| JP | 2004-235481 | 8/2004 |

* cited by examiner

*Primary Examiner*—Christopher P Schwartz
(74) *Attorney, Agent, or Firm*—Kratz, Quintos & Hanson, LLP (57) ABSTRACT

A spring-pressurizing unit includes a pair of screw members which are respectively formed with male and female screws to be screwed to each other and in which after the male and female screws are fastened to each other, a shaft having a predetermined length is formed, a spring disposed as to be wound around the shaft, a pressing member which is disposed on one end of the spring and which is pressed toward the spring after the pair of screw member are fastened to each other, thereby compressing the spring, and a support member which supports the pressing member in a state where the pressing member compresses the spring.

6 Claims, 6 Drawing Sheets

SPRING-PRESSURIZING UNIT AND FITTING-WASHER

This application is a continuation of international application PCT/JP05/002278 filed Feb. 15, 2005.

TECHNICAL FIELD

The present invention relates to a spring-pressurizing unit in which a screw member is allowed to stand like a pillar by screwing a screw member having a shaft of predetermined length, a spring is disposed around the shaft and the screw member is pressed by the spring. The invention also relates to a fitting-washer which is suitably used for the spring-pressurizing unit.

BACKGROUND ART

Conventionally, there is used a spring-pressurizing unit in which a screw member having a shaft is allowed to stand like a pillar, and the member is pressed by a spring around the shaft.

Figure 1:
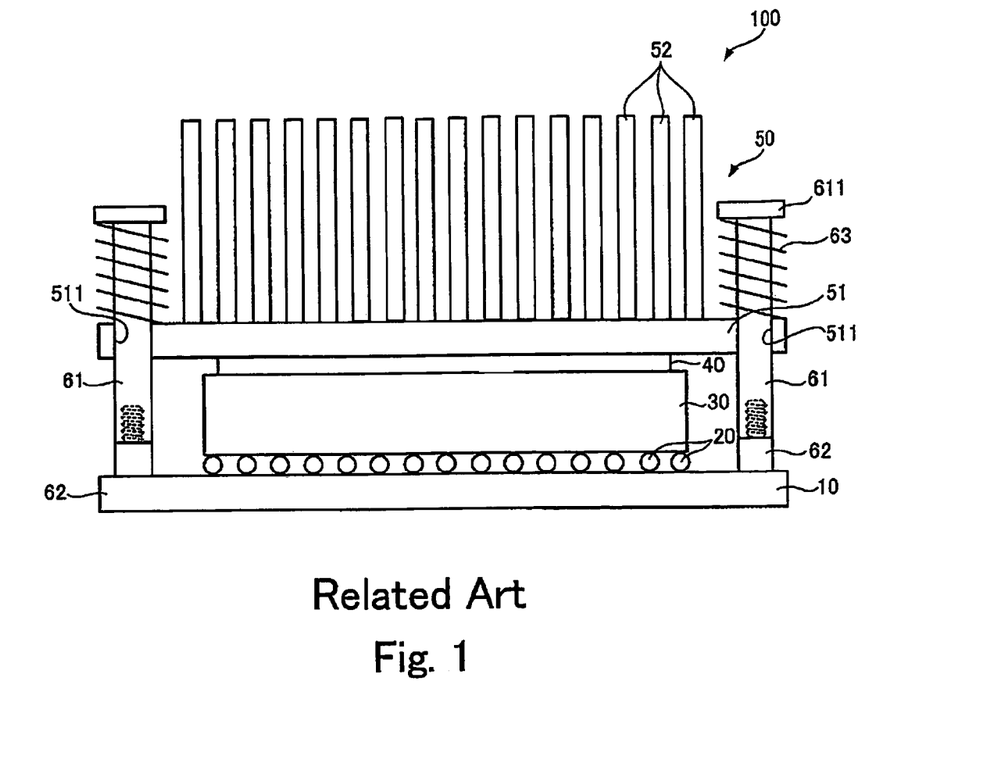
FIG. 1 is a schematic diagram of a package unit having a conventional spring-pressurizing unit.

FIG. 1 is a schematic diagram of a package unit having one example of such a spring-pressurizing unit.

The package unit 100 has such a structure that a semiconductor package 30 is mounted on a system board 10 by melting and fixing solder balls 20, and a cooling unit 50 is disposed on the semiconductor package 30 with a thermally bonding member 40 interposed therebetween. The cooling unit 50 includes a base body 51 and a large number of fins 52 standing on the base body 51. The base body 51 has a through hole 511 formed therein, which a columnar female screw member 61 passes through. A male screw member 62 stands on the system board 10. The female screw member 61 has a head 611 whose diameter is greater than that of the female screw member 61. The shaft of the female screw member 61 passes through a coil spring 63, and a shaft of the female screw member 61 passes through the through hole 511 of the base body 51 of the cooling unit 50. The coil spring 63 is sandwiched between the head 611 of the female screw member 61 and the base body 51 of the cooling unit 50, the coil spring 63 is screwed over the male screw member 62 and fastened. During this screwed state, the coil spring 63 is contracted between the head 611 and the base body 51, the cooling unit 50 is pressed toward the system board 10 by the coil spring 63, the cooling unit 50 comes into intimate contact with the semiconductor package 30 with the thermally bonding member 40 interposed therebetween, and heat of the semiconductor package 30 is efficiently radiated.

Here, the height of the male screw member 62, the length of the female screw member 61, the length of the coil spring 63 and the spring constant are previously determined, and the cooling unit 50 is pressed by the coil spring 63 with a predetermined constant pressing force.

FIG. 1 shows the conventional spring-pressurizing unit having the female screw member 61, the male screw member 62 and the coil spring 63.

Here, if the cooling unit 50 is mounted thereon and the female screw member 61 is screwed over the male screw member 62, the coil spring 63 gradually contracts in the screwing process, and the coil spring 63 presses the cooling unit 50.

Therefore, the female screw member 61 and the male screw member 62 are screwed with each other in a state where screw threads of the female screw member 61 and the male screw member 62 receive a strong force in a direction in which the coil spring 63 tries to extend, and the screw threads are shaved and metal powder is generated. If the female screw member 61 is rotated, the coil spring 63 is rotated due to the screwed state, an end of the coil spring 63 on the side of the base body 51 of the cooling unit 50 shaves the base body 51, and metal powder is generated. The metal powder may become a cause of accident of a short circuit of other circuit parts or wiring on the system board 10.

When the female screw member 61 is screwed over the male screw member 62 manually, since it is necessary to rotate the female screw member 61 against a force which is generated when the coil spring 63 contracts and which acts on the opposite direction, there is a problem that a burden on an arm of an operator is increased.

Here, patent document 1 relates to a direct-type valve gear in which a valve is directly pushed down and opened by rotation of a cam, and discloses a member for compressing a coil spring and a cam which pushes the member, but patent document 1 does not recognize the above problem and does not show solving means of the problem.

Patent Document 1: Japanese Patent Application Laid-open No. 11-148321

DISCLOSURE OF THE INVENTION

In view of the above circumstances, it is an object of the present invention to provide a spring-pressurizing unit in which the above problem is solved, and a fitting-washer used for the spring-pressurizing unit.

A spring-pressurizing unit of the present invention for achieving the above object includes:

a pair of screw members which are respectively formed with male and female screws to be screwed to each other and a shaft having a predetermined length which is formed after the male and female screws are fastened to each other, a spring disposed so as to be wound around the shaft, a pressing member which is disposed on one end of the spring and which is pressed toward the spring after the pair of screw member are fastened to each other, thereby compressing the spring, and a support member which supports the pressing member in a state where the pressing member compresses the spring.

In the case of the spring-pressurizing unit of the invention, since the pressing member compresses the spring after the screw members are fastened to each other, it is unnecessary to apply a strong force to a screw thread during the fastening operation of the screw members, this prevents metal powder from being generated, and an accident occurring due to the metal powder can also be prevented.

Preferably the spring-pressurizing unit of the invention further includes a fitting-washer disposed on one end of the spring, the fitting-washer including an inner washer which is elastically deformed in a direction in which a diameter thereof is reduced, and an outer washer having an opening into which the inner washer is fitted such that the inner washer is elastically deformed in the direction in which the diameter thereof is reduced, wherein the outer washer is pushed toward the spring to compress the spring after the pair of screw member are fastened to each other, thereby allowing the outer washer to function as the pressing member, and the outer washer is pushed toward the spring and as a result, the inner washer comes out from the opening of the outer washer to increase the diameter of the inner washer, the outer washer is supported in a state where the spring is compressed, and thereby allowing the inner washer to function as the support member. In this case, it is further preferable that one of the pair of screw members has a fitting-washer disposing portion having a reduced diameter at a location where the fitting-washer is disposed.

In the spring-pressurizing unit of the invention, it is preferable that a washer having a key hole is disposed on one end of the spring, one of the pair of screw members has a head which is adjacent to the washer and which has a diameter greater than a diameter of the shaft and which has a projection to be fitted into the key hole, the washer is pushed toward the spring after the pair of screw members are fastened to each other, the fitted state of the projection into the key hole is released, and the washer is rotated around the shaft, thereby allowing the washer to function as the pressing member, and allowing the projection to function as the support member.

In the spring-pressurizing unit of the invention, it is preferable that the spring-pressurizing unit further includes a lever member located adjacent to the pressing member, wherein the lever member is turnably and pivotally supported by one of the pair of screw members, the lever member is turned after the pair of screw members are fastened to each other, thereby pushing the pressing member and the lever member is stabilized in a state where the lever member pushes the pressing member.

A fitting-washer of the present invention for achieving the above object includes an inner washer which is elastically deformed in a direction in which a diameter thereof is reduced, and an outer washer having an opening through which the inner washer is fitted such that the inner washer is elastically deformed in the direction in which the diameter thereof is reduced.

In the fitting-washer, it is preferable that the inner washer has a tapered outer diameter which, in a state where the inner washer comes out of the outer washer, extends from a portion having a diameter smaller than a diameter of the opening of the outer washer toward a portion having a diameter greater than the diameter of the opening in a thickness direction of the inner washer.

EFFECT OF THE INVENTION

According to the present invention, it is possible to prevent metal powder from being generated, and the operability is enhanced.

BEST MODE FOR CARRYING OUT THE INVENTION

Embodiments of the present invention will be explained below.

Figure 2:
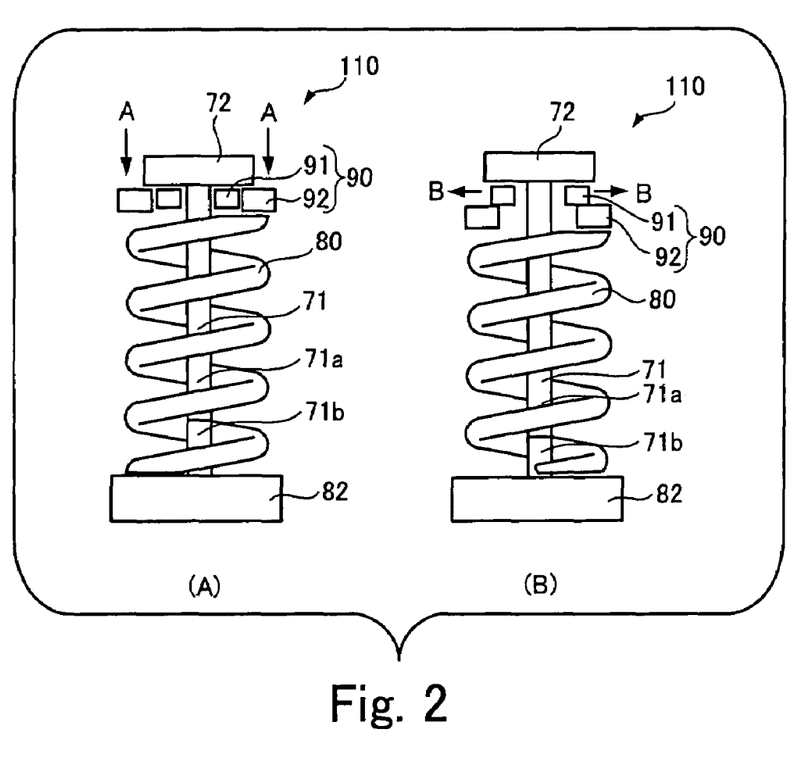
FIG. 2 is a conceptional diagram of a spring-pressurizing unit according to a first embodiment of the invention.

FIG. 2 is a conceptional diagram of a spring-pressurizing unit according to a first embodiment of the invention.

A spring-pressurizing unit 110 shown in FIG. 2 is in a state after the fastening (screwing) operation of a pair of screw members 71a and 71b which are similar to the female screw member 61 and the male screw member 62 shown in FIG. 1 is completed. FIG. 2 shows a shaft 71 formed by fastening the pair of screw members 71a and 71b, a coil spring 80 disposed so as to be wound around the shaft 71, and a fitting-washer 90 disposed on one end of the coil spring 80. The fitting-washer 90 is sandwiched between the coil spring 80 and a head 72 having a large diameter. The coil spring 80 is sandwiched between the head 72 and a pedestal 82.

Figure 3:
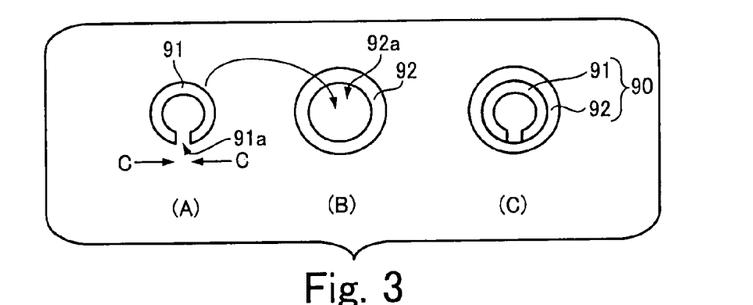
FIG. 3 is a diagram showing a structure of a fitting-washer.

FIG. 3 is a diagram showing a structure of the fitting-washer.

The fitting-washer 90 includes an inner washer 91 having a shape shown in part (A) of FIG. 3 and an outer washer 92 having a shape shown in part (B) of FIG. 3.

As shown in part (A) of FIG. 3, the inner washer 91 has a cut portion 91a formed therein by cutting a portion of a ring of the inner washer 91. The inner washer 91 is elastically deformed in the direction of the arrow C-C, i.e., in the direction for narrowing the cut portion 91a and reducing the diameter of the ring and in this state, the inner washer 91 is fitted into an opening 92a of the annular outer washer 92 shown in part (B) of FIG. 3.

Part (C) of FIG. 3 shows the fitting-washer 90, in the state where the inner washer 91 is fitted in the opening 92a of the outer washer 92 with the inner washer 91 elastically deformed.

Referring back to FIG. 2, and the explanation will be continued.

Part (A) of FIG. 2 shows a state immediately after the fastening operation of the pair of screw members 71a and 71b is completed. From this state, using a jig (not shown) or the like, the inner washer 91 is left and in this state, the outer washer 92 is pushed in the direction of the arrow A-A, i.e., toward the coil spring 80. Then, the inner washer 91 comes out from the opening 92a of the outer washer 92 (see part (B) of FIG. 3) as shown in part (B) of FIG. 2, the diameter is widened outward (in the direction of the arrow B-B), the outer washer 92 abuts against the inner washer 91 and the outer washer 92 can not return to its original position, and the outer washer 92 remains pushing the coil spring 80.

Therefore, if the spring-pressurizing unit 110 (after the length of the shaft 71, the length of the coil spring 80, the thickness of the fitting-washer 90 and the spring constant of the coil spring 80 are designed and adjusted at the time of the production thereof) is applied to the package unit 100 shown in FIG. 1, since the screwing operation can be carried out without compressing the coil spring during the fastening operation, generation of metal powder and adverse influence on an operator can be reduced, and a predetermined pressing force can be generated after the fitting operation.

Here, in the case of the package unit 100 shown in FIG. 1, the package unit 100 is typically screwed at four locations, and in the case of the conventional technique shown in FIG. 1, since a pressing phenomenon is generated by contract of the coil spring 63 during the screwing operation, it is necessary to fastening the screw members located at the four corners little by little many times equally, and the operability is inferior.

Whereas, if the spring-pressurizing unit 110 shown in FIG. 2 is employed, since a pressing force is not generated by the coil spring 80 when the screw member is fastened, the four screw members at the four corners can be fastened completely one by one in regular order and then, using a jig or the like, diagonal two, or four outer washers 92 of the fitting-washers 90 at four corners are pushed down, the operability is largely enhanced.

Figure 4:
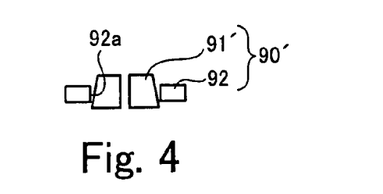
FIG. 4 is a diagram showing a modification of the fitting-washer.

FIG. 4 shows a modification of the fitting-washer.

An outer diameter of an inner washer 91' constituting a fitting-washer 90' is tapered.

Here, the inner washer 91' is disposed in the opening 92a of the outer washer 92, but note that this is the state before the inner washer 91' is compressed in a direction in which the outer diameter of the inner washer 91' is reduced. That is, the outer diameter of the inner washer 91' is tapered in such a manner that the outer diameter of the inner washer 91' is at one end of the inner washer 91' smaller than and at the other end larger than a diameter of the opening 92a of the outer washer 92. In the case of the fitting-washer 90 of the structure shown in FIG. 3, after it is used as shown in part (B) of FIG. 2, if it becomes necessary to exchange the semiconductor package 30 in the package unit 100 shown in FIG. 1, if the fastened state of the screw member is released by some reasons, the inner washer 91 comes out from the outer washer 92, and it is very difficult to again fit the inner washer 91 into the outer washer 92, and they are thrown away after single use.

Whereas, in the case of the fitting-washer 90' of a structure shown in FIG. 4, even when the inner washer 91' comes out from the outer washer 92, it can easily be fitted again, and they can be reused.

Figure 5:
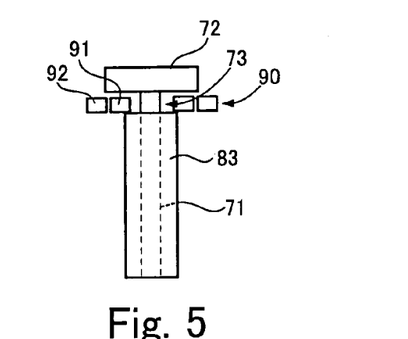
FIG. 5 is a diagram showing a modification of one of a pair of screw members.

FIG. 5 shows a modification of one of the pair of screw members.

FIG. 5 corresponds to a modification of the female screw member 61 shown in FIG. 1. In a state where the fitting-washer 90 is fitted over the shaft 71, the shaft 71 is press-fitted into, for example, a resin cylinder 83 and as a result, a fitting-washer disposing portion 73 whose diameter is reduced is formed at a portion where the fitting-washer 90 is disposed. The coil spring is disposed around the cylinder 83.

The outer diameter of the cylinder 83 is greater than an inner diameter of the inner washer 91 of the fitting-washer 90, and is smaller than the diameter of the opening of the outer washer 92.

Since the fitting-washer disposing portion 72 having the small diameter is formed, when one screw member is fastened to the other screw member, the fitting-washer 90 is prevented from coming out from the screw member, the operability is enhanced, and when the outer washer 92 is pushed down as shown in part (A) of FIG. 2, the inner washer 91 abuts against the cylinder 83, the inner washer 91 automatically stays at the position, and this further enhance the operability.

Figure 6:
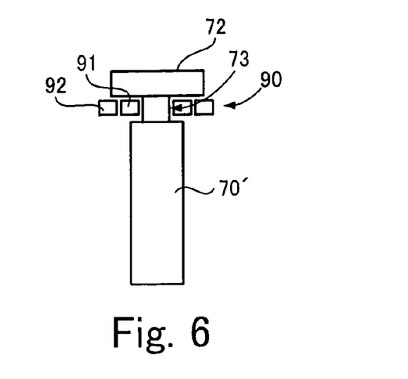
FIG. 6 is a diagram showing another modification of one of a pair of screw members.

FIG. 6 shows another modification of one of the pair of screw members (screw member corresponding to the female screw member 61 shown in FIG. 1).

In the case of a screw member shown in FIG. 6, a portion 70' of the screw member itself corresponding to the cylinder 83 into which the shaft of the screw member is press-fitted is thick in diameter. Thus, even when this screw member is used, the same effect as that shown in FIG. 5 can be expected.

In order to dispose the fitting-washer 90 in the fitting-washer disposing portion 73 which is thin in diameter in the structure shown in FIG. 6, the inner diameter of the inner washer 91 is elastically spread out by force, only the inner washer 91 is first disposed around the fitting-washer disposing portion 73 and then, using a jig, the inner washer 91 is pushed in a direction reducing the diameter of the inner washer 91 and in this state, the outer washer 92 is disposed around the fitting-washer disposing portion 73.

Figure 7:
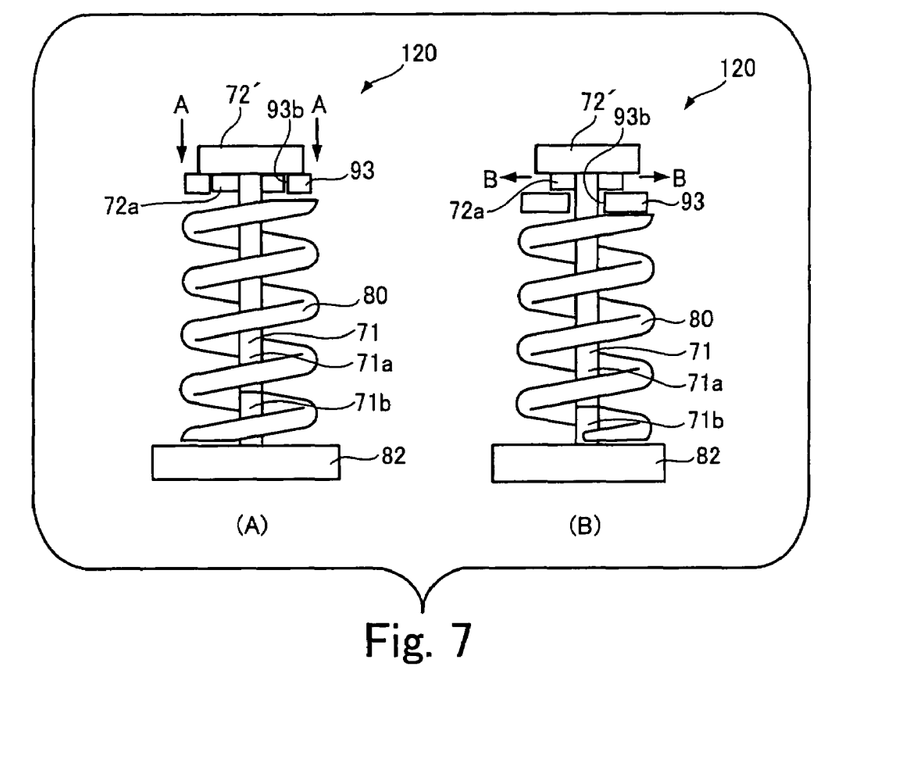
FIG. 7 is a conceptional diagram of a spring-pressurizing unit according to a second embodiment of the invention.

FIG. 7 is a conceptional diagram of a spring-pressurizing unit of a second embodiment of the invention.

Here, the same elements as those of the spring-pressurizing unit 100 of the first embodiment shown in FIG. 2 are designated with the same symbols, and different points will be explained.

In a spring-pressurizing unit 120 shown in FIG. 7, a washer 93 having a key hole 93b formed therein is disposed on one end of the coil spring 80, and projections 72a formed on a lower portion of a head 72' are fitted into the key hole 93b.

Figure 8:
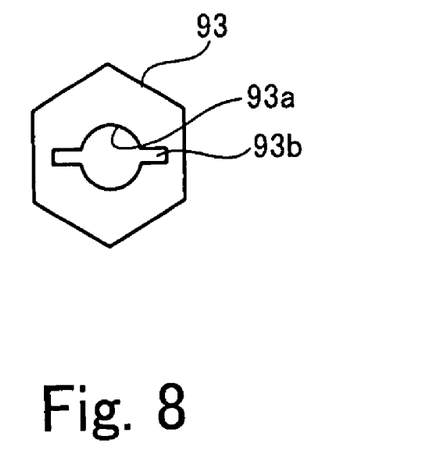
FIG. 8 is a diagram showing a washer used for the spring-pressurizing unit shown in FIG. 7.
Figure 9:
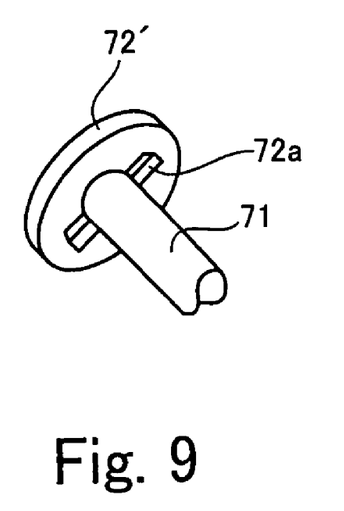
FIG. 9 is a diagram showing a lower surface of a head of a shaft constituting the spring-pressurizing unit shown in FIG. 7.

FIG. 8 shows the washer used for the spring-pressurizing unit shown in FIG. 7. FIG. 9 shows a lower surface of the head of the spring-pressurizing unit shown in FIG. 7.

The washer 93 shown in FIG. 8 has a circular opening 93a formed therein, which the shaft 71 shown in FIG. 7 passes through, and the key hole 93b connected to the opening 93a. In a state shown in part (A) of FIG. 7, the projections 72a provided on the lower surface of the head 72' shown in FIG. 9 is fitted into the key hole 93b.

Referring back to FIG. 7, explanation will be continued.

Part (A) of FIG. 7 shows a state immediately after the fastening operation of the pair of screw members is completed. From this state, using a jig (not shown) for example, the washer 93 is pushed in the direction of the arrow A-A, i.e., toward the coil spring 80, the fitted state between the key hole 93b (see FIG. 8) and the projections 72a of the head 72' is released, and the washer 93 is rotated through 90°. Then, the washer 93 abuts against the projections 72a as shown in part (B) of FIG. 7 and the washer 93 can not return to its original position, and the washer 93 remains pushing and contracting the coil spring 80.

Therefore, like the case of the spring-pressurizing unit 110 shown in FIG. 2, if the spring-pressurizing unit 120 (after the length of the shaft 71, the length of the coil spring 80 and other parameters are designed and adjusted at the time of the production thereof) is applied to the package unit 100 shown in FIG. 1, since the screwing operation can be carried out without compressing the coil spring during the fastening operation, generation of metal powder and adverse influence on an operator can be reduced, and the operability is enhanced.

Here, as shown in FIG. 8, nothing is provided at a position rotated through 90° with respect to the position of the key hole 93b of the washer 93, but a groove may be formed at that rotated position into which the projections 72a of the head 72' which come out from the key hole 93b enter lightly so that the washer 93 is not easily rotated further from that position.

Figure 10:
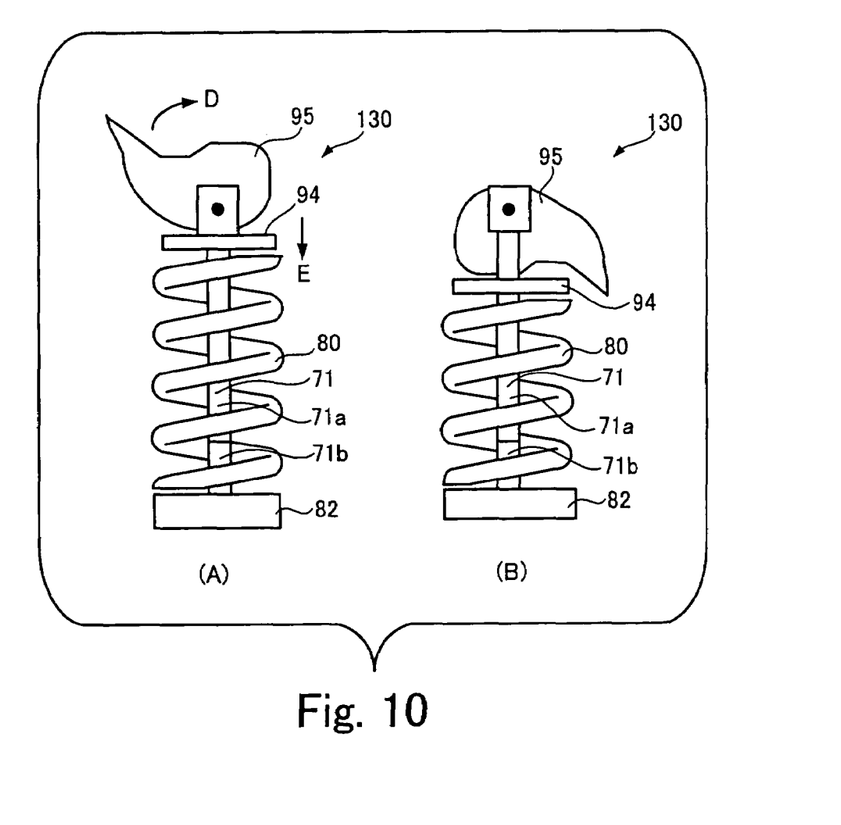
FIG. 10 is a conceptional diagram of a spring-pressurizing unit according to a third embodiment of the invention.

FIG. 10 is a conceptional diagram of a spring-pressurizing unit of a third embodiment of the invention.

The same elements as those of the spring-pressurizing unit 100 of the first embodiment shown in FIG. 2 are also designated with the same symbols, and different points will be explained.

In a spring-pressurizing unit 130 shown in FIG. 10, the pressing member 94 is disposed on one end of the coil spring 80, and a lever member 95 pivotally supported by the shaft 71 is disposed on the pressing member 94. Here, the pressing member 94 has an opening therein which the shaft 71 passes through. The lever member 95 can turn between an attitude shown in part (A) of FIG. 10 and an attitude shown in part (B) of FIG. 10. The lever member 95 has such a shape that the lever member 95 is stabilized in the attitude shown in part (B) of FIG. 10 and is not turned from the attitude shown in part (B)

of FIG. 10 toward the attitude shown in part (A) of FIG. 10 unless a force is intentionally applied.

Part (A) of FIG. 10 shows a state immediately after the fastening operation of the pair of screw members 71a and 71b is completed. If the lever member 95 is turned in the direction of the arrow D from this state, the pressing member 94 moves in the direction of the arrow E, the pressing member 94 presses the coil spring 80 and is stabilized in the attitude shown in part (B) of FIG. 10.

With the structure shown in FIG. 10, the same effect as those of the first and second embodiments can be expected.

The invention claimed is:

1. A spring-pressurizing unit comprising:
a pair of screw members which are respectively formed with male and female screws to be screwed to each other and a shaft having a predetermined length which is formed in a state where the male and female screws are fastened to each other,
a spring disposed so as to be wound around the shaft,
a pressing member which is disposed on one end of the spring and which is pressed toward the spring in the state where the pair of screw member are fastened to each other, thereby compressing the spring, and
a support member which supports the pressing member in a state where the pressing member compresses the spring, wherein the pressing member has a through-hole into which the support member is fitted,
wherein the support member is an inner washer which is elastically deformed by receiving pressure from the pressing member in a direction in which a diameter thereof is reduced,
the pressing member is an outer washer having the through-hole into which the elastically-deformed inner washer is fitted, and
when the outer washer is pushed toward the spring and in the state where the male and female screws are fastened to each other, the inner washer comes out from the through-hole of the outer washer and the diameter of the inner washer is increased thereby supporting the outer washer in a state where the spring is compressed.

2. The spring pressurizing unit according to claim 1, wherein one of the pair of screw members has a fitting-washer disposing portion having a reduced diameter at a location where the inner washer and the outer washer are disposed.

3. A spring-pressurizing unit comprising:
a pair of screw members which are respectively formed with male and female screws to be screwed to each other and a shaft having a predetermined length which is formed in a state where the male and female screws are fastened to each other,
a spring disposed so as to be wound around the shaft,
a pressing member which is disposed on one end of the spring and which is pressed toward the spring in the state where the pair of screw member are fastened to each other, thereby compressing the spring, and
a support member which supports the pressing member in a state where the pressing member compresses the spring,
wherein the pressing member is a washer having a key hole,
one of the pair of screw members has a head which is adjacent to the washer and which has a diameter greater than a diameter of the shaft and which has a projection serving as the supporting member to be fitted into the key hole,
the projection is released from the key hole of the washer, and the washer is rotated around the shaft when the washer is pushed toward the spring in a state where the pair of screw members are fastened to each other.

4. A fitting-washer comprising:
an outer washer; and
an inner washer having a cutout portion, which is elastically deformed by receiving pressure from the outer washer in a direction in which a diameter thereof is reduced, the outer washer having a through-hole into which the elastically-deformed inner washer is fitted,
the inner washer being elastically deformed thereby reducing the diameter thereof is disposed within the through-hole of the outer washer and returns to an original non-deformed state in which the inner washer expands broader than the through-hole of the outer washer upon coming out of the outer washer to press the outer washer against a spring pressurizing the outer washer.

5. The fitting-washer according to claim 4, wherein the inner washer has a tapered outer diameter which, in a state where the inner washer comes out of the outer washer, extends from a portion having a diameter smaller than a diameter of the opening of the outer washer toward a portion having a diameter greater than the diameter of the opening in a thickness direction of the inner washer.

6. A spring-pressurizing unit comprising:
a pair of screw members which are respectively formed with male and female screws to be screwed to each other and a shaft having a predetermined length which is formed in a state where the male and female screws are fastened to each other;
a spring disposed so as to be wound around the shaft;
a pressing member which is disposed on one end of the spring and which is pressed toward the spring in the state where the pair of screw members are fastened to each other, thereby compressing the spring;
a support member which supports the pressing member in a state where the pressing member compresses the spring; and
a lever member located adjacent to the pressing member,
wherein the lever member is turnably and pivotally supported by one of the pair of screw members, the lever member is turned in a state where the pair of screw members are fastened to each other, thereby pushing the pressing member and the lever member is stabilized in a state where the lever member pushes the pressing member, and
the pressing member has an opening through which the shaft is passed.

* * * * *